United States Patent [19] … [11] Patent Number: 4,894,807
Alam et al. … [45] Date of Patent: Jan. 16, 1990

[54] SIMULTANEOUS VERTICAL-SEISMIC PROFILING AND SURFACE SEISMIC ACQUISITION METHOD

[75] Inventors: M. Aftab Alam, Weybridge, England; Akkas Manzur, Houston, Tex.

[73] Assignee: Western Atlas International, Inc., Houston, Tex.

[21] Appl. No.: 152,969

[22] Filed: Jun. 16, 1988

[51] Int. Cl.⁴ ............................................... G01V 1/20
[52] U.S. Cl. ....................................... 367/15; 367/57; 367/58; 367/21; 181/112
[58] Field of Search .................. 367/15, 20, 57, 58, 367/21; 181/112

[56] References Cited

U.S. PATENT DOCUMENTS

| | | | |
|---|---|---|---|
| 2,331,080 | 10/1943 | Petty | 367/63 |
| 3,189,870 | 6/1965 | Roever | 367/20 |
| 3,906,352 | 9/1975 | Parker | 367/19 |
| 4,486,863 | 12/1984 | French | 367/15 |
| 4,506,352 | 3/1985 | Brandsaeter et al. | 367/21 |
| 4,627,036 | 12/1986 | Wyatt | 367/57 |

OTHER PUBLICATIONS

"The Relation between the VSP-CDP Transformation & VSP Migration", Wiggins et al., 49th Europe Ass. Explor. Geophy. Mtg., 6/9/87.
"Interactive VSP-CDP Mapping in Complex Media", Cassell et al., Geophy., vol. 50, #8, Aug. 1985.

Primary Examiner—Thomas H. Tarcza
Assistant Examiner—Ian J. Lobo
Attorney, Agent, or Firm—Barry C. Kane

[57] ABSTRACT

An inventive method for simultaneously collecting depth-of-focus vertical seismic profiling (VSP) data and three-dimensional surface seismic data is disclosed. At least one seismic sensor is deployed at a predetermined depth of a borehole and raised in increments determined by the survey. A seismic source and a plurality of seismic sensor may be deployed at the surface along a partial arc offset from the top of the borehole by a distance inversely proportional to the depth of the sensor in the borehole. The seismic source generates a seismic signal at a plurality of points in a circular path around the borehole. Once a circle has been completed, the borehole sensor is raised, and the seismic signal generator and sensors are moved to the next largest circular path and the process is repeated. The seismic signals are simultaneously recorded by the borehole sensor and the sensors deployed in the arcuate path. The object is to overlap areal VSP coverage with surface seismic coverage to reduce the number of variables which influence correlation of the two data sets.

14 Claims, 1 Drawing Sheet

SIMULTANEOUS VERTICAL-SEISMIC PROFILING AND SURFACE SEISMIC ACQUISITION METHOD

BACKGROUND OF THE INVENTION

This invention is related to seismic particularly to a method for obtaining seismic data having improved resolution.

Marine surface seismic surveys are traditionally obtained by towing a streamer cable up to several kilometers in length, in a series of parallel, spaced apart lines, and actuating an acoustic source at periodic intervals. Both the acoustic source and streamer cable are towed by a vessel containing appropriate navigation timing and recording equipment necessary to collect seismic data. The streamer cable extending behind the vessel contains hundreds and perhaps thousands of hydrophones spaced along its length for receiving transient seismic signals. The hydrophonss convert the received seismic signal into an electrical or optical signal which is transmitted to the recording equipment aboard the vessel. The data collected and recorded provide an approximation of the subsurface of the earth between the source and the sensors each time the source is actuated. The data collected by the hydrophones are often corrected for deviations caused by ocean currents or wind currents which cause the cable to snake or drift away from the line intended to be surveyed.

The technique briefly described above provides a series of two-dimensional representations of the subsurface. It was realized that by collecting data in one direction and then collecting data in a perpendicular direction, the resulting data could provide essentially a three-dimensional representation of the subsurface. This technique was shortened by first using two ships streaming parallel to each other which provided three linear surveys. This was later improved upon by using only one ship which was capable of deploying several streamers that simultaneously detected the reflected seismic signals.

In another attempt to increase areal coverage, at least one streamer cable is towed behind a vessel which steers circular tracks around surveyed points within the area of interest. Assuming that the subsurface reflectors are horizontal, the sweeping streamer following the vessel samples a swath of the subsurface. That is to say that the mid-point between the source and each receiver in the streamer cable tracks a slightly different concentric circle or arc. The width of the swath is determined by the radius the vessel steers and the length of the streamer cable. The locations of the hydrophones along the streamer length are determined by a complex combination of devices.

Traditionally, before or after a seismic survey of an area, it is desirable to determine the velocities of the subsurface intervals within the region of interest. This information is typically attained by conducting a vertical seismic profile (VSP) of the subsurface. Often a VSP survey is previously conducted on a borehole in or near the seismic survey. The velocities provided by that survey are used in processing the data collected in the seismic survey. If a VSP cannot be done, other techniques are available to derive the subsurface velocities, but these other methods are mere approximations in contrast to available VSP data.

As previously mentioned, VSP surveys are typically conducted before or after a seismic survey of the area.

A traditional VSP survey consists of deploying one or more sensors towards the bottom of the borehole. A source for generating seismic signals is located at the surface laterally offset from the well. Two methods are often used: the first method calls for the seismic source to generate signals at a single location while the sensors are raised in incremental distances. The second method requires the sensors to remain stationary and the seismic source is incrementally moved towards, or away from the top of the well after each signal is generated.

VSP surveys provide a much better determination of the subsurface velocities because the seismic signals suffers less attenuation due to its reduced propagation distance. Additionally, the seismic signal only needs to pass through the weathered layer only once. The weathered layer often alters the signals of surface seismic data. A great disadvantage to collecting VSP data using either of the methods described above is that many variables exist which alter the detected signals, thus the determined velocities may not be as accurate as they possibly could be. One of the characteristics believed to influence the accuracy of VSP surveys is the angle of incidence of the acoustic signal upon the target reflector. It is probable that as the angle of incidence is changed for a seismic signal, the amplitude is also effected. If the amplitude is affected so might also the frequency or velocity of the signal.

The accuracy of VSP data is critical when trying to define the areal limits of petroleum deposits. The limits of a petroleum reservoir are often determined using seismic data. The VSP data collected from the borehole are correlated to the surface seismic data in order to recognize the seismic response of the reservoir, however since the seismic data and VSP data are often collected using different sources at different times, and most likely with different sensors and angles of incidence, the VSP data may not be correlatable to the surface seismic data. Thus, the reservoir limits may not always be accurately defined because of the different characteristics under which the two data sets (VSP and surface seismic) are collected.

SUMMARY OF THE INVENTION

In an embodiment of the instant invention, a method is disclosed for collecting continuous coverage subsurface data around a borehole while simultaneously collecting three-dimensional surface seismic data away from the borehole. In the instant invention, two sets of seismic data are collected in a combined vertical seismic profile (VSP) survey and a surface seismic survey. The VSP survey is recorded in a depth-of-focus shooting pattern. In this manner, the seismic data are recorded with a source to receiver combination that subtends a substantially constant reflection angle at the target depth. A seismic source is radially offset above a borehole by a predetermined distance. A plurality of receivers are located in a circle or partial arc of predetermined radius above the borehole. In addition, at least one sensor is located at a known depth in the borehole. A seismic source generates a signal at a plurality of points around the borehole at the same radial offset distance as the circularly positioned receivers. The seismic source may be moved in equal increments either towards the borehole or away after each circle is completed. The borehole receiver is similarly moved in equal increments so as to maintain within a small range the reflection angle off the target interval from the source. Thus as the source is moved away from the borehole, the receiver is raised. Similarly, as the source is moved towards the top of the hole, the borehole receiver is lowered. Simultaneous with the VSP survey, the seismic sensors located at the surface around the borehole also receive reflected signals from the subsurface. In marine applications, the seismic sensors may be located in a streamer cable towed by a vessel having the associated seismic source. The signals detected by the sensors record a swath of reflector points midway between the source and each receiver as the vessel steers a circle around the borehole. The received data results in a three-dimensional survey. Alternatively, in land operations the source may be a truck-mounted vibrator which generates signals at many points along a circle above the borehole. The sensor geophones may be located in a grid above the borehole. The appropriate geophones would be rolled along in a well-known manner to obtain the three-dimensional data.

The collected data set from the VSP survey is processed using an interactive VSP-CDP transform procedure to obtain an image of the subsurface. The three-dimensional data collected by the surface sensors are processed in an appropriate method. Both data sets are inverted into acoustic impedance which allows the two data sets to be calibrated with respect to each other resulting in a better correlation between the VSP and surface seismic data.

BRIEF DESCRIPTION OF THE DRAWING FIGURES

The features and advantages of this invention will be better understood by reference to the drawings and the accompanying description, wherein.

DETAILED DESCRIPTION OF THE PREFERRED EMBODIMENT

Figure 1:
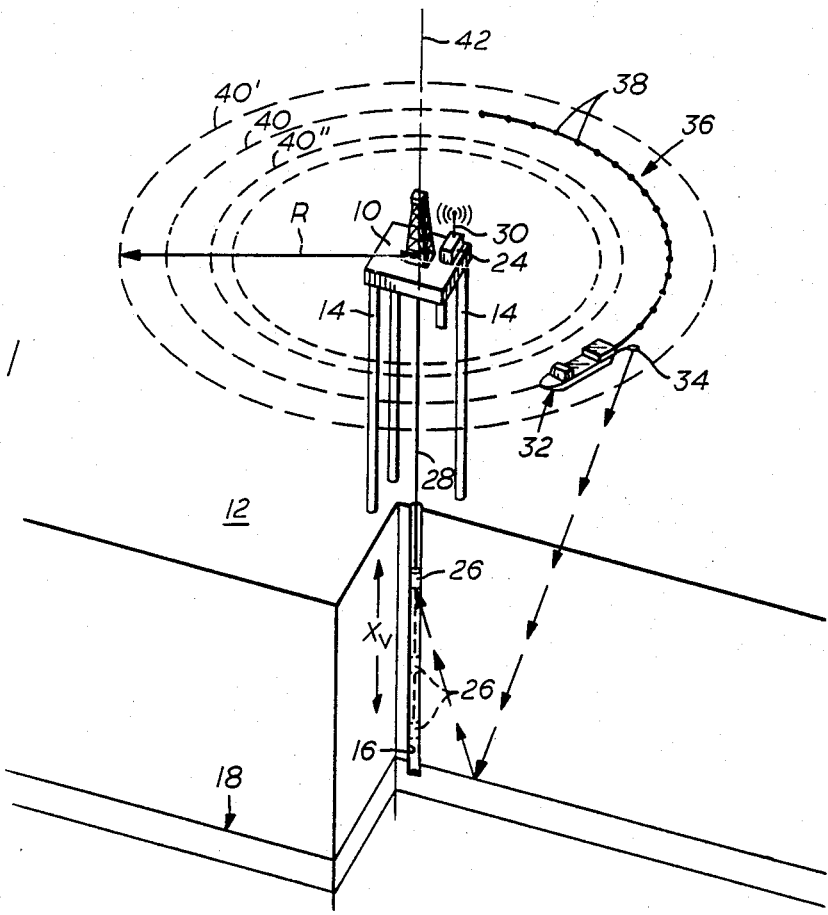
FIG. 1 is a general illustration of a technique for simultaneously shooting vertical seismic profile data as well as surface seismic data.

In viewing the figures, like reference numerals indicate like components. FIG. 1 is a general illustration of a technique fo simultaneously shooting vertical seismic profile (VSP) data as well as surface seismic data. As typically used in offshore petroleum exploration, a drilling or production platform 10 is positioned above an area of interest of the sea floor 12. The platform depicted in the figure rests directly upon the sea floor 12 supported by a plurality of legs 14. Alternatively, the platform may be a semi-submersible and held on station by a plurality of anchors and cables. As is well known, semisubmersible platforms are used in regions having water depths greater than several hundred feet. Located beneath the platform 10 and penetrating the subsurface of the earth is a borehole 16. For the purposes of the discussion it will be assumed that the borehole is substantially vertical and penetrates the subsurface to a depth of $-10,000$ feet mean sea level through a target horizon 18. The target horizon 18 may be a reservoir or any other depth of interest to the geologist or production engineer. For simplicity, horizon 18 is shown horizontal, but in reality the beds may be dipping and contorted.

Located on the platform 10 may be a recording unit 24 operably interconnected to at least one borehole sensor 26 through a length of cable 28. The recording unit may contain appropriate equipment to record signals sent from the sensor in response to transient seismic signals. Alternatively, the recording unit may contain a transceiver coupled to an antenna 30 for transmitting the received seismic data to a remote station located on a ship or another platform. The length of cable 28 should be sufficient to allow the borehole sensor to be lowered in the borehole to a depth commensurate with the target horizon 18. The borehole sensor 26 may also be allowed to come to rest at any other depth $X_y$ within the borehole.

Shown circling the platform 10 is a seismic vessel 32 towing a seismic source 34 usually submerged 20 to 35 feet below the surface. Towed behind the seismic source 34 and operably coupled to a recording unit inside the vessel 32 may be a streamer cable 36 which is neutrally buoyant and positioned at a substantially constant depth of 15 feet. The streamer cable may contain a plurality of detectors 38 disposed at known intervals along its length. Also disposed at intervals along the cable may be compasses, depth gauges and thermometers. For the purposes of this description a detector may be defined as a single hydrophone or a group of hydrophones coupled to provide a single output. Up to as many as 1000 groups may be contained in a streamer cable several kilometers long. Alternatively cables as long as several hundred meters may be employed. For the purposes of illustration only, a few detectors 38 are identified along the length of the streamer cable 36, however, it should be understood that many others are present.

Vessel 32 is shown steering a circular course 40 about an orbital focus 42 located substantially above the borehole 18. The seismic sourc 34 and streamer cable 36 towed behind follow substantially the same course with minor fluctuations caused by wind and ocean currents. The radius of the circular course 40 from the orbital focus 42 is represented as R which varies inversely to the borehole sensor depth $X_y$. For example, if the borehole sensor 26 is positioned at the maximum depth $X_{max}$, the vessel 32 steers a tight circular course having a short radius of $R_{min}$. The relationship between the borehole sensor depth $X_y$ and the radius of the circular course R is such that a substantially constant angle of reflection is maintained off the target horizon 18 from the seismic source 34 to the borehole sensor 26. Although any angle of reflection will suffice depending upon the desired results, however, it is preferred that the angle of reflection be maintained between 15 and 25 degrees from the normal to the target horizon 18. For example, if the borehole penetrated the target horizon at a depth of $-10,000$ feet and assuming that the VSP survey will be conducted over the entire depth of the borehole, and that a substantially constant reflection angle of 25 degrees from the normal is preferred, the maximum radius $R_{max}$ for VSP coverage is twice the depth times the tangent of 25 degrees. Thus, according to this expression, for a 10,000 foot borehole, radius $R_{max}$ for a SP survey is approximately 9,300 feet. For a substantially constant 15 degree reflection angle off the target horizon, the maximum radius $R_{max}$ would approximately equal 5,300 feet from the orbital focus. Provided the vessel could steer a circular course about the platform 10 at a radius $R_{min}$ equal to one-half $R_{max}$ without tangling the streamer cable 36 with the platform, VSP coverage of the borehole would be complete.

Figure 2:
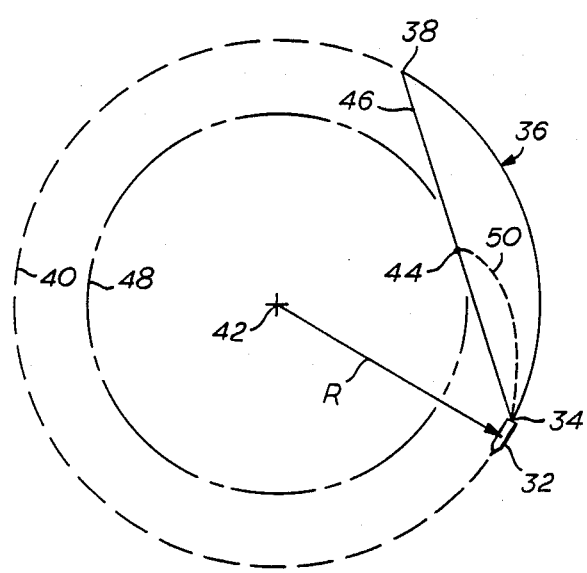
FIG. 2 is an areal view of a schematic representing only one circular course steered by a vessel.

As briefly mentioned above, simultaneous with the collection of VSP data, regular surface seismic data may also be gathered. FIG. 2 is an areal view of a schematic representing only one circular course steered by vessel 32. For the purpose of this figure, the vessel 32 and seismic source location are assumed to be coincident. As mentioned above, the radius of the circular course 40 is identified as R. A mid-point 44 may be identified along a chord line 46 located between the source 34 and the last detector 38 located at the distal end of the streamer cable 36. As the vessel steers the circular course 40, the mid-point 44 of the chord line 46 tracks along an inner circle identified as 48. A chord line such as 46 may be defined for each detector 38 in the streamer cable 36. The mid-points of the collective chord lines 46 define a locus of points illustrated by line 50. The circular course tracked by each mid-point differs slightly from each other because of the circular course of the streamer cable, but all are concentric with each other about the orbital focus 42. From the above description, the areal coverage of the surface seismic survey may be changed by altering the radius of the circular course steered or by changing the length of the streamer cable. The shorter the radius, or the greater the cable length, the greater the distance between the mid-point of the longest chord line 46 and the streamer cable 36.

Figure 3:
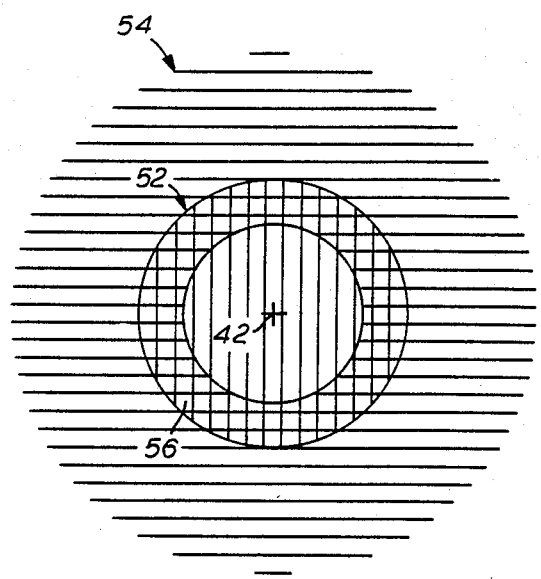
FIG. 3 is a schematic representation of the subsurface coverage obtained by the inventive method.

Using both of the techniques described above, VSP data and surface seismic data may be collected simultaneously. The simultaneous shooting of VSP and surface seismic removes many of the problems present in the prior art technique. That is to say that the number of variables between the two data sets are reduced providing a more accurate and clean correlation between the data sets. FIG. 3 provides a general explanation of how this is accomplished through an areal view of the collection geometry. Located at the center of the figure is the orbital focus 42 located substantially directly above the borehole 18 and the point about which the circular courses are steered. The inner circle 52 enclosing the vertical hatching is the subsurface area at the target depth covered by VSP data. The outer circle 54 containing the horizontal hatching is the area of the subsurface target sampled only by surface seismic data. The annular region 56 between the two circles containing the crosshatching is the area of the target simultaneously sampled by both VSP and surface seismic data sets. The data common between the two data sets are used in later calibration and correlation known in the industry to provide the resulting improved output.

The following is a description of a preferred mode for simultaneously shooting both the VSP and surface seismic data.

Assume that the target depth is located at −10,000 feet mean sea level and the borehole 16 penetrates the target. Also assume that the length of the streamer cable 36 is 1,800 feet and the desired range of reflection angles is 10 degrees between 15 and 25 degrees from the gravitational vertical. Using simple geometry, the smallest circular course the vessel 32 can steer about the orbital focus 42 has a radius $R_{min}$ of 2679 feet. This radius provides a 15 degree reflection angle at the target depth of the borehole 16. Assuming VSP coverage is to be collected over the entire depth of the borehole, the maximum radius $R_{max}$ for receiving the VSP signal near the top of the borehole 16 is essentially 9,326 feet. This radius provides a reflection angle equal to 25 degrees off the target horizon 18. Thus VSP coverage of the target horizon 18 extends from the base of the borehole 16 outwards to a radius of 4,663 feet. The surface seismic coverage of the target horizon 18 begins at a radius of 2529 feet from the orbital focus 42 due to the feathering effect of the streamer cable discussed above. The feathering effect caused by the curvature of the streamer cable is the line defined by the locu of mid-points of the many chord lines 46 discussed earlier. Therefore, actual surface seismic coverage is located inward of he vessel radius by an amount equal to the offset of the midpoint of the longest chord line. The region of surface seismic coverage extends outwards from the borehole 18 as far as desired to adequately cover the subsurface region of interest. Using the constraints outlined above, the areal coverage of simultaneous VSP and surface seismic coverage is contained within the annulus defined by the radius 2529 feet and the greater radius of 4663 feet. It should be apparent that as the radius of the circular course increases, the areal swath of the surface seismic survey decreases. For example, when the vessel 32 steams around the orbital focus at a radius of 2679 feet, the swath determined by the midpoint of the longest streamer cable chord is 150 feet for a 1800 foot cable. At a radius of 4663 feet, the swath is reduced to about 87 feet for the same cable length. At a 10,000 foot radius, the swath is reduced to 40 feet of coverage.

From the geometry discussed above, the same technique may be employed in onshore seismic surveys. In such onshore surveys, the seismic source is preferably vibratory, however, other sources such as explosives may also be used. Although in an offshore survey, the required areal coverage of geophones may be logistically impractical, grids may be positioned and appropriate sets of geophones activated using a roll-along technique known in the industry.

Once the desired survey area has been covered, using either the offshore or onshore technique, both the VSP and surface seismic data are inverted to provide acoustic impedance. The great advantage to the inversion is the VSP data may be calibrated with the surface seismic data from the overlapping region of the survey. This inversion and calibration provides better data correlation and aiding the interpretation process. It is apparent to those skilled in the art that this technique removes many of the variables which may have influenced earlier techniques of collecting VSP and surface seismic data separately. It is also apparent that this inventive technique reduces costs by removing the need for two separate surveys.

The above description should be considered exemplary and that of preferred embodiments only. Modifications of the inventive method will become apparent to those who make and use the invention. Such modifications may be considered within the scope of the invention set forth and limited only by the appended claims.

We claim:

1. A method of seismic exploration comprising the steps of:
   (a) conducting a vertical seismic profile survey about a borehole penetrating the subsurface of the earth, said borehole having at least one seismic sensor located therein at a predetermined depth; and
   (b) conducting a surface seismic survey simultaneous with said vertical seismic profile survey, said surface seismic survey employing a plurality of detectors deployed in a partial arc having an orbital focus located substantially above said borehole as conditions permit, said at least one seismic sensor located within said borehole and said detectors deployed within said partial arc adapted to receive transient signals generated by a seismic source positioned along said partial arc, a radius of said arc having an inverse relationship to the depth of said at least one seismic sensor located within said borehole.

2. A method of seismic exploration, comprising the steps of:
   (a) deploying at least one seismic sensor at a predetermined depth within a borehole penetrating a region of interest;
   (b) deploying a plurality of detectors in at least a partial circle around said borehole and having an orbital focus located substantially above said borehole, a radius of said partial circle having a predetermined relationship with the depth of said at least one seismic sensor located within said borehole;
   (c) generating seismic signals at predetermined intervals along said at least partial circle, said seismic signals propagating downward and reflected at a substantially constant angle by subsurface features and received by said at least one sensor in said borehole and by said detectors deployed in said at least partial circle, said at least one sensor and said detectors receiving seismic signals reflected from a common subsurface region; and
   (d) correlating said seismic signals common to said at least one sensor and said detectors.

3. A method for collecting seismic data, comprising the steps of:
   (a) deploying at least one seismic sensor at a predetermined depth in a borehole;
   (b) deploying a plurality of detectors in at least a partial circle having an orbital focus located substantially at the top of said borehole;
   (c) generating a seismic signal at a predetermined point along said at least partial circle, said seismic signal propagating downward, reflected by subsurface strata and received by said at least one seismic sensor located along said borehole, and by said plurality of detectors within said at least partial circle, said at least one seismic sensor and said plurality of detectors receiving said seismic signal from a subsurface region common therebetween; and
   (d) correlating the seismic signal received by said at least one seismic sensor with the seismic signal received by said plurality of detectors.

4. A method of seismic exploration, comprising the steps of:
   (a) deploying at least one sensor in a borehole located at a predetermined depth;
   (b) towing a seismic streamer cable behind a vessel steering a partial circle of predetermined radius and having an orbital focus located substantially above said borehole;
   (c) generating seismic signals from a source associated with said vessel;
   (d) receiving reflected seismic signals from said source at said at least one sensor located in said borehole while simultaneously receiving reflected seismic signals at s id streamer cable, said at least one sensor and said streamer cable providing an output indicative of the received seismic signals; and
   (e) correlating the output indicative of the received seismic signals from a reflected subsurface horizon common to said at least one sensor and said streamer cable.

5. The method as defined by claim 1, further comprising the step of maintaining a substantially constant reflection angle of the transient signals generated by the seismic source, reflected off a target horizon located in the subsurface of the earth to the at least one seismic sensor located in the borehole.

6. The method as defined by claim 5, further comprising:
   (a) inverting the transient signals received by said at least one seismic sensor and by said detectors to yield acoustic impedance; and
   (b) calibrating the acoustic impedance of transient signals received by said at least one seismic sensor with the acoustic impedance of transient signals received by said detectors to provide improved correlation of transient signals received over a common subsurface region.

7. The method as defined by claim 2, wherein said radius of said partial circle having a predetermined relationship with the depth of said at least one seismic sensor located within the said borehole is an inverse relationship, whereby the greater the depth of said at least one seismic sensor, the lesser the radius of said partial circle.

8. The method as defined by claim 2, wherein the substantially constant angle is between 15 and 25 degrees from a normal to the subsurface features.

9. The method as defined by claim 2, wherein the step of correlating the seismic signals common to the at least one sensor and the detectors comprises the steps of:
   (a) inverting the seismic signals received to provide acoustic impedance;
   (b) calibrating the acoustic impedance of the seismic signals received by said detectors to the acoustic impedance of the seismic signals received by the at least one sensor; and
   (c) correlating the subsurface features identified by the at least one seismic sensor to the subsurface features identified by the detectors.

10. The method as defined by claim 3, further comprising the step of maintaining a substantially constant reflection angle of said seismic signal off a predetermined one of the subsurface strata to the one seismic sensor by changing a radius of said at least partial circle inversely to the predetermined depth of the seismic sensor deployed in the borehole.

11. The method as defined by claim 9, wherein the step of correlating comprises the steps of:
   (a) converting the seismic signal received by the seismic sensor and a plurality of detectors into acoustic impedance;
   (b) calibrating the acoustic impedance of the seismic signal received by the plurality of detectors to the acoustic impedance of the seismic signal received by the seismic sensor; and
   (c) correlating the subsurface strata detected by the plurality of detectors to the subsurface strata detected by the seismic sensor.

12. The method as defined by claim 1, wherein the plurality of detectors employed in the surface seismic survey are hydrophones.

13. The method as defined by claim 2, wherein the step of deploying a plurality of detectors in at least a partial circle around said borehole comprises the step of towing a seismic streamer cable along the partial arc.

14. The method as defined by claim 2, wherein the step of deploying a plurality of detectors in at least a partial circle around said borehole comprises the step o placing a string of geophones along the partial circle.

* * * * *